US 11,142,095 B2

(12) United States Patent
Kim et al.

(10) Patent No.: US 11,142,095 B2
(45) Date of Patent: Oct. 12, 2021

(54) CONTROL SYSTEM FOR SEAT OF VEHICLE

(71) Applicants: HYUNDAI MOTOR COMPANY, Seoul (KR); KIA MOTORS CORPORATION, Seoul (KR)

(72) Inventors: Eun Sue Kim, Ansan-si (KR); Dae Ig Jung, Suwon-si (KR); Seung Hyeok Chang, Suwon-si (KR); Hong Heui Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 125 days.

(21) Appl. No.: 16/540,634

(22) Filed: Aug. 14, 2019

(65) Prior Publication Data

US 2020/0282866 A1 Sep. 10, 2020

(30) Foreign Application Priority Data

Mar. 6, 2019 (KR) .......................... 10-2019-0025804

(51) Int. Cl.
*B60N 2/00* (2006.01)
*B60N 2/02* (2006.01)

(52) U.S. Cl.
CPC .... *B60N 2/0244* (2013.01); *B60N 2002/0268* (2013.01)

(58) Field of Classification Search
USPC .............................................. 701/36, 45–49
See application file for complete search history.

(56) References Cited

U.S. PATENT DOCUMENTS

| 6,501,536 | B1* | 12/2002 | Fredricks | B60R 1/02 180/271 |
| 8,044,782 | B2* | 10/2011 | Saban | B60N 2/002 340/438 |
| 8,249,780 | B2* | 8/2012 | Fujiwara | B60N 2/01 701/49 |
| 2004/0256894 | A1* | 12/2004 | McManus | B60N 2/203 297/93 |
| 2007/0080013 | A1* | 4/2007 | Melz | B60N 2/42736 180/274 |
| 2007/0106429 | A1* | 5/2007 | Endo | B60N 2/002 701/1 |
| 2007/0229661 | A1* | 10/2007 | Aoki | B60R 21/01538 348/148 |

(Continued)

FOREIGN PATENT DOCUMENTS

| JP | 2017-114314 A | 6/2017 |
| KR | 10-1724944 B1 | 4/2017 |

*Primary Examiner* — Jonathan L Sample
(74) *Attorney, Agent, or Firm* — Morgan, Lewis & Bockius LLP

(57) ABSTRACT

A control system for a seat of a vehicle, the control system includes: a seat actuator disposed at each of seats in the vehicle to implement motions of the seats including folding, reclining, sliding, or rotating of the seats; a motion calculator calculating types and degrees of motions of the seats based on information about a passenger and an object received from a user; and a driving controller enabling all of the passenger and the object input by the user to be loaded by controlling the seat actuators in accordance with a calculation result of the motion calculator.

11 Claims, 5 Drawing Sheets

(56) References Cited

U.S. PATENT DOCUMENTS

| | | | |
|---|---|---|---|
| 2007/0229662 A1* | 10/2007 | Aoki | B60R 21/01538 |
| | | | 348/148 |
| 2009/0243356 A1* | 10/2009 | Fujiwara | B60N 2/0244 |
| | | | 297/257 |
| 2012/0086249 A1* | 4/2012 | Hotary | B60N 2/838 |
| | | | 297/284.3 |
| 2014/0309806 A1* | 10/2014 | Ricci | G06F 21/32 |
| | | | 701/1 |
| 2015/0127224 A1* | 5/2015 | Tabe | B60R 22/48 |
| | | | 701/45 |
| 2016/0185259 A1* | 6/2016 | Itou | B60N 2/0244 |
| | | | 318/3 |
| 2016/0280094 A1* | 9/2016 | Frye | B60N 2/0228 |
| 2016/0280096 A1* | 9/2016 | Bonk | B60N 2/206 |
| 2017/0057379 A1* | 3/2017 | Wang | B60N 2/002 |
| 2017/0072816 A1* | 3/2017 | Lippman | B60N 2/0232 |
| 2017/0136842 A1* | 5/2017 | Anderson | B60G 17/016 |
| 2017/0166089 A1* | 6/2017 | Frye | B60N 2/0296 |
| 2017/0197522 A1* | 7/2017 | Lopez Pinana | B60N 2/835 |
| 2018/0111511 A1* | 4/2018 | Lota | B60N 2/0232 |
| 2018/0154799 A1* | 6/2018 | Lota | B60K 35/00 |
| 2018/0264975 A1* | 9/2018 | Bonk | B60N 2/06 |
| 2018/0290563 A1* | 10/2018 | Minato | B60N 2/0727 |
| 2018/0334062 A1* | 11/2018 | Park | B60N 2/39 |
| 2019/0106038 A1* | 4/2019 | Rose | B60N 2/757 |
| 2019/0283634 A1* | 9/2019 | Parker | B60N 2/39 |
| 2020/0047641 A1* | 2/2020 | D'Eramo | A47C 3/04 |
| 2020/0171979 A1* | 6/2020 | Yetukuri | B60N 2/002 |

* cited by examiner

CONTROL SYSTEM FOR SEAT OF VEHICLE

CROSS REFERENCE TO RELATED APPLICATION

The present application claims priority to Korean Patent Application No. 10-2019-0025804, filed Mar. 6, 2019 in the Korean Intellectual Property Office, the entire contents of which is incorporated herein for all purposes by this reference.

TECHNICAL FIELD

The present disclosure relates to a control system for a seat of a vehicle, the system enabling passengers and objects to be conveniently loaded by adjusting seats before they are loaded in accordance with the types and sizes of the passengers and the objects.

BACKGROUND

Recently, vehicles such as an SUV have been spotlighted due to an increase in leisure activity, etc. Further, many box-shaped concepts have been proposed for a self-driving vehicle. These vehicles are fundamentally required to enable many people to get in the vehicles and a lot of objects to be loaded.

However, according to all the vehicles in the related art, a user could adjust seats in person to load many passengers and object. However, in this case, a user had to individually adjust several seats, and the user had to adjust seats every time regardless of the number of passengers is large or small.

Accordingly, it was difficult to automatically prepare an optical environment for loading passengers and objects even though a user does not adjust seats in advance to load a lot of passengers and objects.

The description provided above as a related art of the present disclosure is just for helping understanding the background of the present disclosure and should not be construed as being included in the related art known by those skilled in the art.

SUMMARY

The present disclosure has been made in an effort to solve the problems and an object of the present disclosure is to provide a control system for a seat of a vehicle, the system enabling convenient loading of a user and objects by adjusting seats in advance in accordance with the types and sizes of passenger and objects.

According to an exemplary embodiment of the present disclosure, a control system for a seat of a vehicle includes: a seat actuator disposed at each of seats in the vehicle to implement motions of the seats including folding, reclining, sliding, or rotating of the seats; a motion calculator calculating types and degrees of motions of the seats based on information about a passenger and an object received from a user; and a driving controller enabling all of the passenger and the object input by the user to be loaded by controlling the seat actuators in accordance with a calculation result of the motion calculator.

The motion calculator may receive information of a passenger and an object from a user through a user mobile terminal or a vehicle terminal.

The information about a passenger may include a physical condition of a passenger and whether the passenger is a driver.

The motion calculator may match a passenger with a seat in accordance with the information of the passenger.

The motion calculator may calculate the type and degree of motion of a seat in accordance with a height of a passenger of the information of the passenger.

The motion calculator may set a space in the vehicle where an object is to be positioned in accordance with the information of the object.

When an object is to be positioned on a seat, the motion calculator may match a seat in accordance with information of the object, and calculates a type and degree of motion of the matched seat.

The information of an object may include a size of the object.

When there are a plurality of objects, the motion calculator may match seats where the objects are to be loaded in consideration of a whole size of the objects and information of passengers, and calculate types and degrees of motions of the matched seats and surrounding seats.

When there are a plurality of objects, the motion calculator may calculate loading positions and a loading order of the objects on the basis of an object having a largest long side of long sides of the objects.

The motion calculator may inform the user of the calculated types and degrees of motions of the seats through a user mobile terminal or a vehicle terminal, and when confirmation of a user is received, the driving controller may control the seat actuators.

The control system may further include a sensor measuring a surrounding space of a passenger sitting on a seat in a vehicle.

The motion calculator may calculate in advance an expected surrounding space when a passenger sits on a seat, and when a passenger actually gets in a vehicle and a actual surrounding space is smaller than the expected surrounding space, may calculate additional motions of the seat such that the actual surrounding space measured by the sensor reaches the expected surrounding space; and the driving controller may control the seat actuators so that the additional motions are achieved.

When a passenger gets in a vehicle and a surrounding space measured by the sensor is smaller by a predetermined level than a reference space prepared in advance, the motion calculator may calculate additional motions of a seat such that the surrounding space of the passenger reaches the reference space and the driving controller may control a corresponding seat actuator so that the additional motions are achieved.

According to the control system for a seat of a vehicle of the present disclosure, it is possible to enable a user to load passengers and objects by adjusting seats in advance in accordance with the types and sizes of the passengers and objects before they are loaded.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
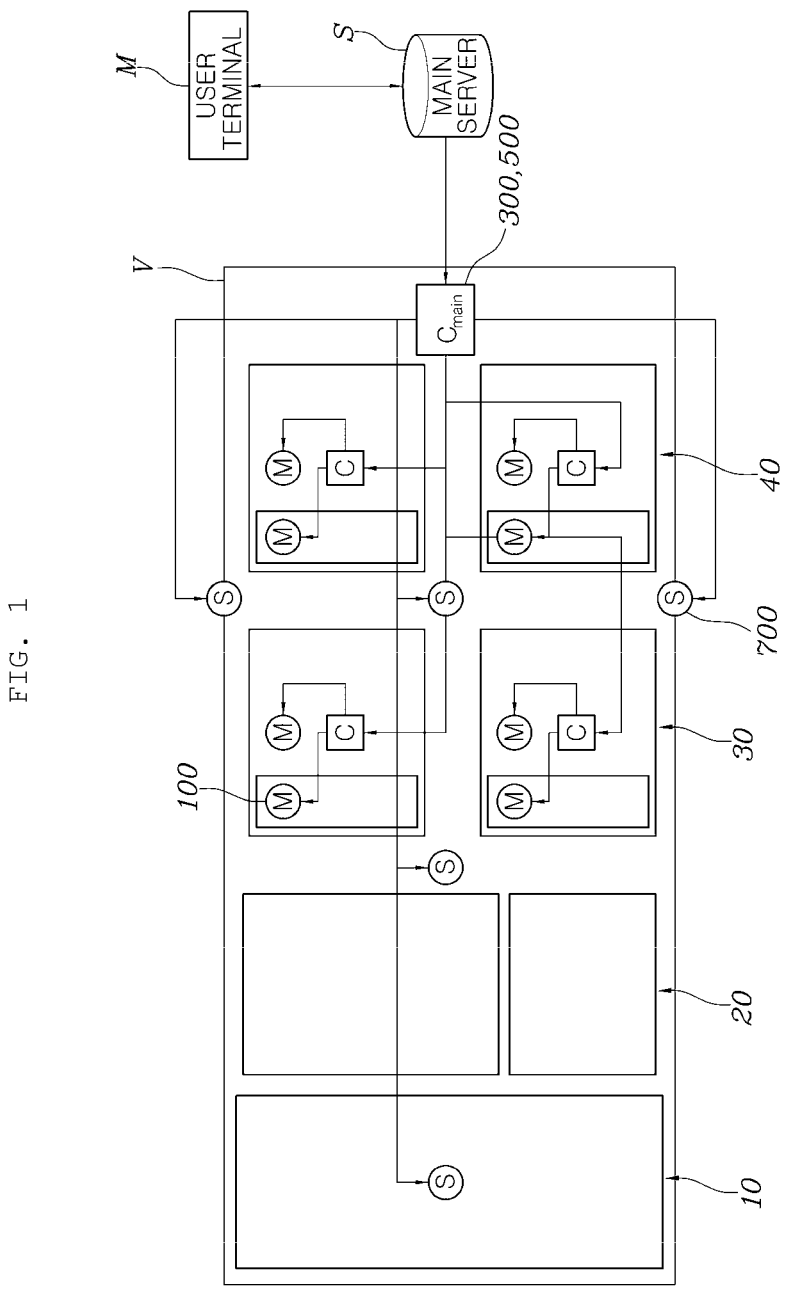
FIG. 1 is a diagram illustrating the configuration of a control system for a seat of a vehicle according to an exemplary embodiment of the present disclosure.
Figure 2:
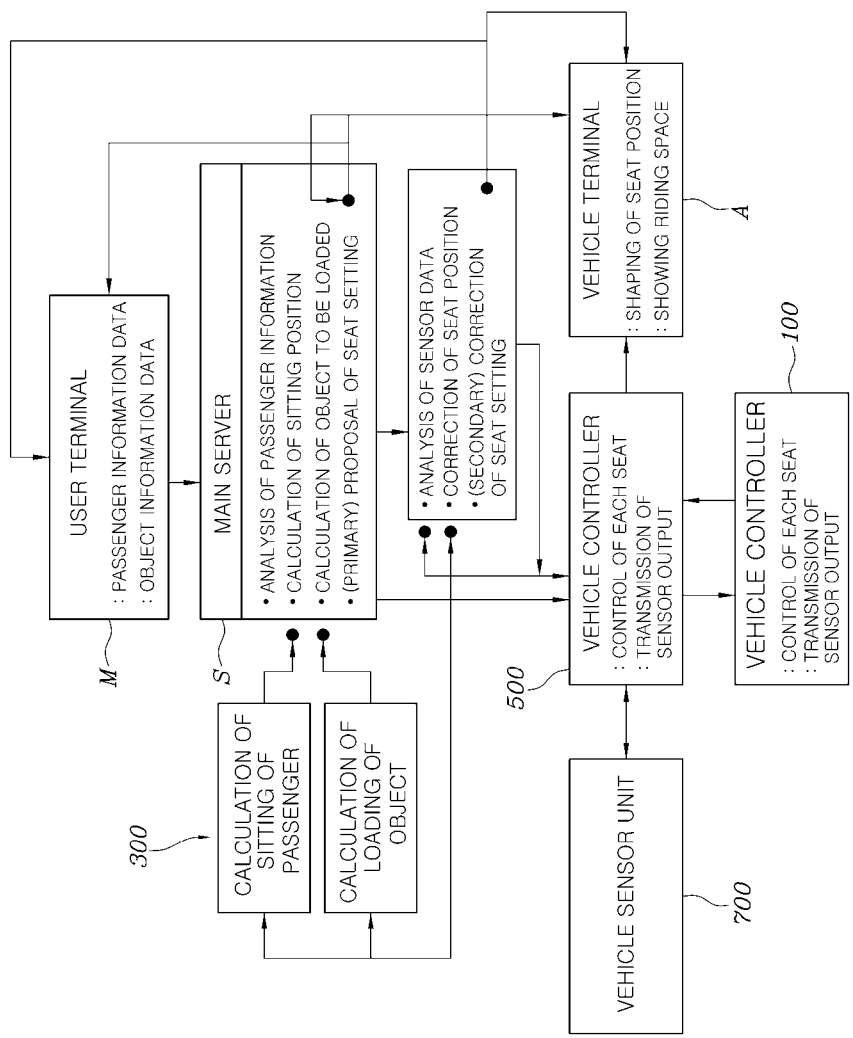
FIG. 2 is a block diagram of a control system for a seat of a vehicle according to an exemplary embodiment of the present disclosure.
Figure 3:
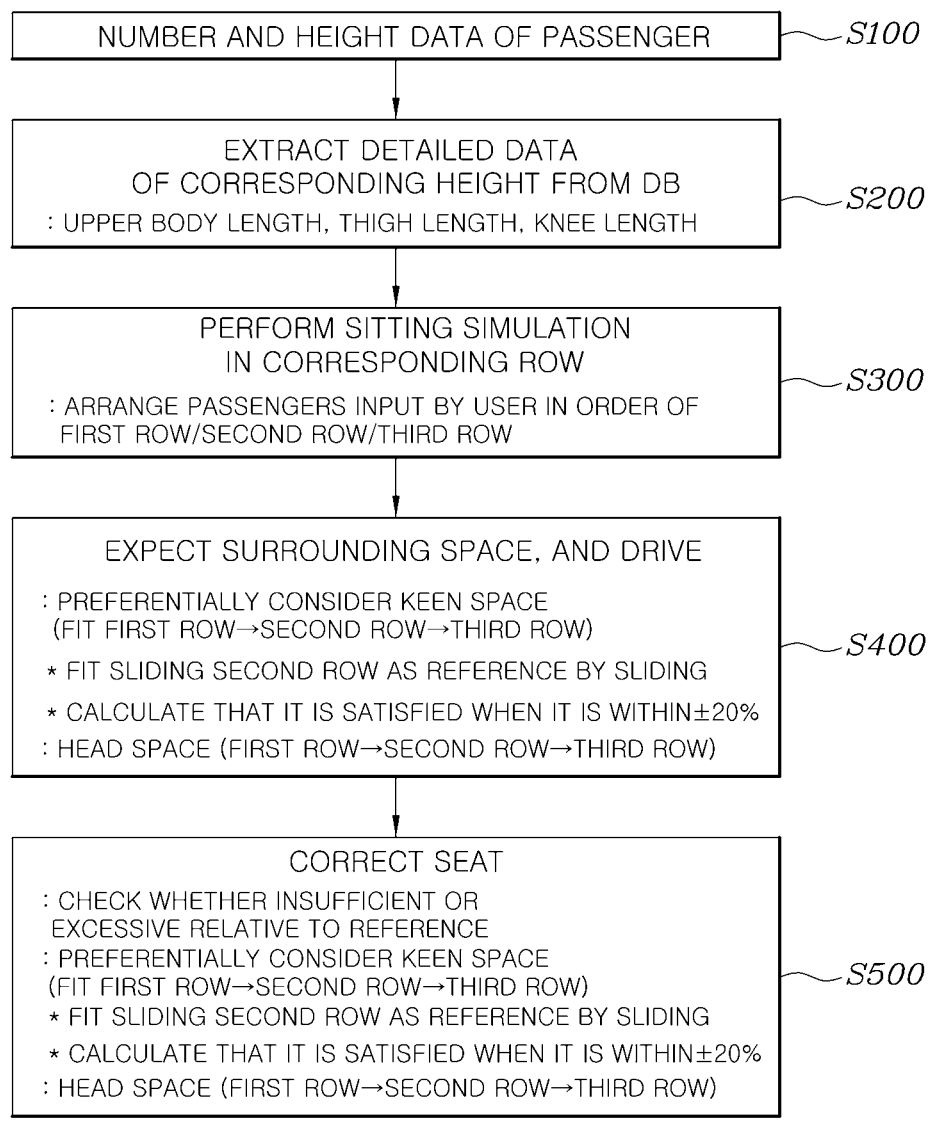
FIG. 3 is a control flowchart of a control system for a seat of a vehicle according to an exemplary embodiment of the present disclosure.
Figure 4:
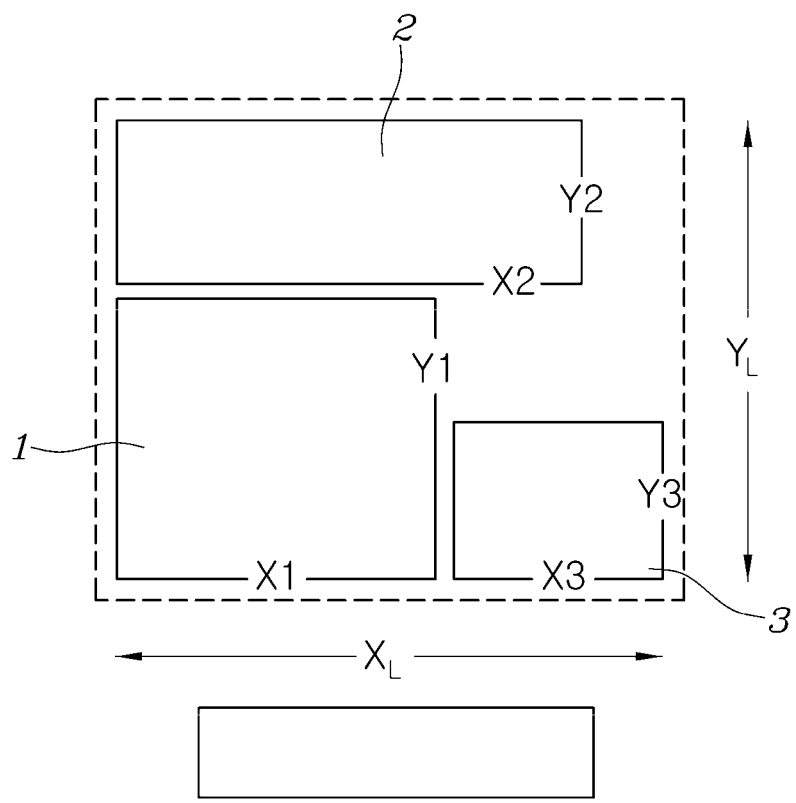
FIGS. 4 and 5 are view illustrating loading of objects by a control system for a seat of a vehicle according to an exemplary embodiment of the present disclosure.
Figure 5:
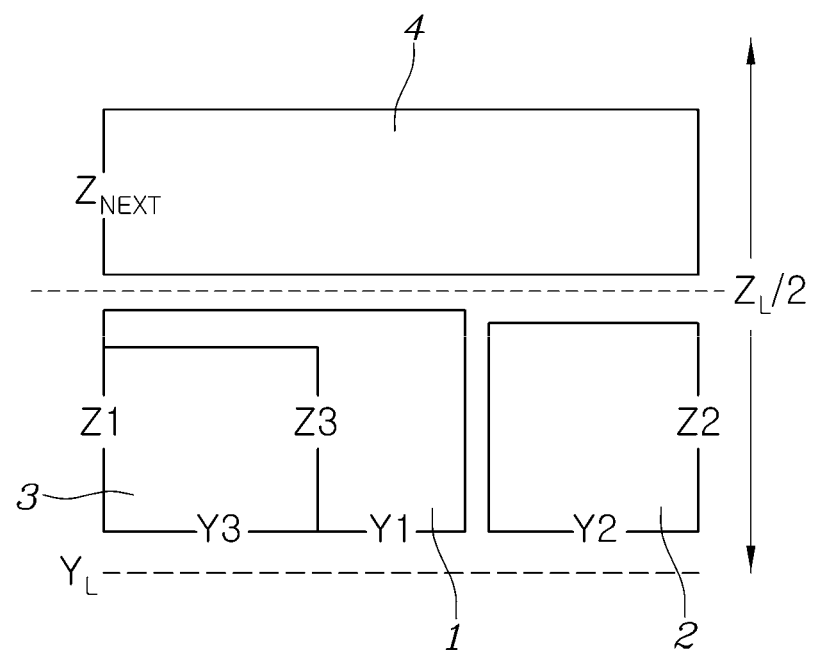

FIG. 1 is a diagram illustrating the configuration of a control system for a seat of a vehicle according to an exemplary embodiment of the present disclosure, FIG. 2 is a block diagram of a control system for a seat of a vehicle according to an exemplary embodiment of the present disclosure, FIG. 3 is a control flowchart of a control system for a seat of a vehicle according to an exemplary embodiment of the present disclosure, and FIGS. 4 and 5 are view illustrating loading of objects by a control system for a seat of a vehicle according to an exemplary embodiment of the present disclosure.

A control system for a seat of a vehicle V according to an exemplary embodiment of the present disclosure includes: a seat actuator 100 installed at each of seats 20, 30, and 40 in a vehicle to implement motions of the seats including folding, reclining, sliding, or rotating of the seats; a motion calculator 300 calculating types and degrees of motions of the seats on the basis of information about passengers and objects received from a user; and a driving controller 500 enabling all of the passengers and objects input by the user to be loaded by controlling the seat actuators 100 in accordance with the calculation result of the motion calculator 300.

FIG. 1 is a diagram illustrating the configuration of a control system for a seat of a vehicle according to an exemplary embodiment of the present disclosure and shows an SUV with a first row 40, a second row 30, and a third row 20 each of which has left/right seats. In general, the seats in the third row 20 and the second row 20 are configured to be foldable so that a trunk 10 can be expanded in this case. Further, in this case, the seats in the first row 40 and the second row 40 can be fully automatically controlled through motors etc., but it is also possible to fully automatically control the seats in the third row 20.

In order to load a plurality of passengers and a number of objects in such a vehicle designed to load several people, it is possible to secure a space for loading objects by folding some of the seats in the third row 20 and sliding or reclining the seats in the second row 30. Further, it may be possible to additionally secure a space for loads by further sliding seats forward when women or children are loaded.

The present disclosure is characterized in that a vehicle improves convenience for a user and allows the interior space of the vehicle to be efficiently used through calculated arrangement by automatically moving in advance seats in accordance with optimal combination even though a user inputs the information about passengers and objects.

In detail, to this end, the seat actuator 100 is installed at each of the seats in the vehicle to implement motions such as folding, reclining, sliding, or rotating of the seats. One or a plurality of seat actuators provided for each of the seats may be a motor or an electromagnet, that is, is a mechanical device that can implement folding, reclining, sliding, or rotating of the seats, or combination thereof.

The motion calculator 300 may be configured with the driving controller 500 of the vehicle or may be provided in an external server S. The motion calculator 300 receives information about passengers and objects input from a user. The motor calculator calculates the types and degrees of motions of the seats on the basis of the input information.

The driving controller 500 controls the seat actuators of the seats in accordance with the calculation result by the motion calculator 300 so that all of the passengers and objects input from the user to be able to be loaded. The motion calculator 300 may be designed as the concept of one controller together with the driving controller 500 or may be configured to perform calculation in the external server S and than transmit calculated values to the driving controller.

In detail, the motion calculator 300 can receive information about passengers and objects input from a user through a user mobile terminal M of a user or a vehicle terminal A. The user can input information about passengers and objects to a server or directly to the vehicle through his/her smartphone or PC.

The information about a passenger may include the physical condition of the passenger and whether the passenger is a driver or a fellow rider. This is because when the passenger is a driver, it is required to allocate the driver seat and control the driver's seat in advance to fit to the physical condition. The motion calculator 300 can match passengers and the seats, respectively, in accordance with the information about the passengers. When passengers are fellow riders, optimal positions are allocated for the passengers, respectively, in accordance with their physical conditions. For example, it may be possible to allocate forward seats for relatively large people and rear seats for relatively small people.

The motion calculator 300 can calculate the types and degrees of motions of the seats in accordance with the height of passengers of the information of the passengers. In detail, the body of a person can be discriminated into the length of the upper body, the length of the thighs, and the length of the calves, so it is possible to secure leg room by sliding a seat and head room by reclining a seat and adjusting the height of the seat. That is, head room is secured by lowering and reclining a seat when an upper body is long, leg room is secured by sliding a seat when thighs are long, and a seat is lifted to prevent a passenger from feeling a pain in the waist when claves are long.

A height may be representative of the information of a passenger. The motion calculator 300 may have a table of an upper body length, a thigh length, a calf length, etc. in accordance with a height. Accordingly, the motion calculator 300 may select a seat and then calculate motions of the seat using the data in the table when a height is input, or may have a data map to immediately match a height with motions when a height is input. It is possible to provide optimal posture and space for a passenger regardless of the methods, which can be performed by a processor in the vehicle or in the server, as described above.

The motion calculator 300 can set a space in the vehicle where objects are loaded in accordance with the information of objects. This is because a trunk would be enough for relatively small objects, but it may be necessary to fold the seats in the third row and then load objects in the trunk and the third row when objects are relatively large. Accordingly, when an object has to be loaded on a seat, the motion calculator 300 can match a seat in accordance with the information of the object and calculate the type and degree of motion of the matched seat. That is, it may be possible to expand the trunk by folding the matched seat and secure an additional space by sliding other surrounding seats.

The information of an object may include the size of the object. It is possible to express the size of an object using an X-axis, a Y-axis, and a Z-axis, and a space is calculated and seats are controlled based on the entire 3D-size of an object. To this end, a user may have to input the size of each object.

In detail, when there is a plurality of objects, the motion calculator 300 may match seats where the objects are required to be loaded in consideration of the whole size of the objects and the information of passengers and calculate the types and degrees of motions of the matched seats and surrounding seats. When there are a plurality of objects, the motion calculator may calculate the loading positions and order of the objects on the basis of the object having the largest long side of the long sides of the objects.

FIGS. 4 and 5 are views illustrating loading of objects by a control system for a seat of a vehicle according to an exemplary embodiment of the present disclosure, in which when the entire width of a loading space is $X_L$, other objects are arranged on the basis of the object having the largest length X1. The sum of X1 and X2 or X3 is larger than $X_L$, so that the object of X1 is loaded and then the objects of X1 and X2 are loaded. Further, it is required to check whether the loading satisfies the entire length $Y_L$ of the object space. Further, when there is an additional object, it may be possible to load the additional object on an object satisfying ½ of the entire height $Z_L$ of the space.

On the other hand, the motion calculator 300 can inform the user of the calculated types and degrees of motions of seats through the mobile terminal or the vehicle terminal, and when confirmation of a user is received, the driving controller can control the seat actuators.

In particular, the control system for a seat of a vehicle of the present disclosure may further include a sensor 700 that measures the spaces of passengers sitting on a seat in a vehicle.

In this case, the motion calculator 300 can calculate in advance an expected surrounding space when a passenger sits on a seat, and when a passenger actually gets in the vehicle and an actual surrounding space is smaller than the expected surrounding space, can calculate additional motions of the seat such that the actual surrounding space measured by the sensor 700 reaches the expected surrounding space. Further, the driving controller 500 can control the seat actuators so that the additional motions can be achieved.

Alternatively, when a passenger gets in the vehicle and a surrounding space measured by the sensor 700 is smaller by a predetermined level than a reference space prepared in advance, the motion calculator 300 calculates additional motions of a seat such that the surrounding space of the passenger reaches the reference space and the driving controller 500 can control a corresponding seat actuator 100 so that the additional motions can be achieved.

That is, the result of the calculated motions of a seat unavoidably has an error from the actual state, depending on the difference in physical condition and sitting posture of people. Accordingly, a process of automatically correcting the errors is necessary. To this end, a vision sensor etc. is mounted in the vehicle to actually measure leg room or head room for passengers after passengers and objects are loaded, and finely adjusts seats within a possible range when the room is insufficient, thereby achieving final convenience.

To this end, it may be possible to expect in advance surrounding spaces after passengers get in the vehicle, and then perform corrects by comparing the expected spaces with the actual spaces, and it may be possible to perform correction when the actually measured space is the absolute space or smaller.

FIG. 2 is a block diagram of a control system for a seat of a vehicle according to an exemplary embodiment of the present disclosure. A user inputs necessary information first through the user terminal M. The motion calculator 300 calculates motions of seats. The server S shows the result of the motions on the user terminal M or the vehicle terminal A to receive confirmation. When the user confirms, the driving controller 50 controls the seat actuators 100 to achieve the motions of the seats. After the motions are finished and passengers get in the vehicle, the sensor 700 measures the surrounding spaces of the passengers (the distance between the knees and the forward seats, the distance between the head and the head linings, etc.), and when the surrounding spaces are insufficient, the motions of the seats are corrected by the motion calculator 300, the driving controller 500, and the seat actuators 100.

FIG. 3 is a control flowchart of a control system for a seat of a vehicle according to an exemplary embodiment of the present disclosure. Information is received from a user (S100), simulation is performed and shown and confirmation is received (S200 and S300), and then a seat is primarily operated (S400). Secondary correction is performed after passengers and objects are loaded (S500). Leg room is secured first and then head room is secured in the process of both seat motion calculation and correction, and the space of the first row is first secured and then the space of the third row is secured in order to most efficiently use spaces.

According to the control system for a seat of a vehicle, a vehicle recognizes a passenger, proposes an optimal seat, and automatically controls the seat. Further, a space is maximally used by inputting/measuring in advance the information of objects and passengers to be loaded. Accordingly, it is possible to enable a user to load passengers and objects by adjusting seats in advance in accordance with the types and sizes of the passengers and objects before they are loaded.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:

1. A control system for a seat of a vehicle, the control system comprising:
   a seat actuator disposed at each of seats in the vehicle to implement motions of the seats including folding, reclining, sliding, or rotating of the seats;
   a motion calculator calculating types and degrees of motions of the seats based on information about a passenger and an object received from a user; and
   a driving controller enabling all of the passenger and the object input by the user to be loaded by controlling the seat actuators in accordance with a calculation result of the motion calculator;
   wherein the motion calculator sets a space in the vehicle where the object is to be positioned in accordance with the information about the object,
   wherein the information about the object includes a size of the object using an X-axis, a Y-axis, and a Z-axis, and the space is calculated and the seats are controlled based on an entire 3D-size of the object, and
   wherein, when there are a plurality of objects, the motion calculator calculates loading positions and a loading order of the objects based on an object having a longest length among the plurality of objects.

2. The control system of claim 1, wherein the motion calculator receives the information about the passenger and the object from the user through a user mobile terminal or a vehicle terminal.

3. The control system of claim 1, wherein the information about passenger includes a physical condition of the passenger and whether the passenger is a driver.

4. The control system of claim 1, wherein the motion calculator matches the passenger with one of the seats in accordance with the information about the passenger.

5. The control system of claim 1, wherein the motion calculator calculates the types and degrees of motions of the seats in accordance with a height of the passenger.

6. The control system of claim 1, wherein, when the object is positioned on one seat among the seats, the motion calculator matches the seat in accordance with the information about the object and calculates a type and a degree of motion of the matched seat.

7. The control system of claim 1, wherein, when there are a plurality of objects, the motion calculator matches seats where the objects are to be loaded in consideration of a whole size of the objects and information about the passenger and calculates types and degrees of motions of the matched seats and remaining seats.

8. The control system of claim 1, wherein the motion calculator informs the user of the calculated types and degrees of motions of the seats through a user mobile terminal or a vehicle terminal, and wherein, when the driving controller receives confirmation of the user, the driving controller controls the seat actuators.

9. The control system of claim 1, further comprising a sensor measuring an actual surrounding space of a passenger sitting on a seat among the seats in the vehicle.

10. The control system of claim 9, wherein the motion calculator calculates in advance an expected surrounding space when the passenger sits on the seat, and wherein when the passenger actually gets in the vehicle and the actual surrounding space is smaller than the expected surrounding space, the motion calculator calculates additional motions of the seat such that the actual surrounding space reaches the expected surrounding space and the driving controller controls the seat actuators to achieve the additional motions.

11. The control system of claim 9, wherein when the passenger gets in the vehicle and the actual surrounding space measured by the sensor is smaller by a predetermined level than a reference space prepared in advance, the motion calculator calculates additional motions of the seat such that the actual surrounding space of the passenger reaches the reference space and the driving controller controls a corresponding seat actuator to achieve the additional motions.

* * * * *